US008428261B2

(12) United States Patent
Schneider et al.

(10) Patent No.: US 8,428,261 B2
(45) Date of Patent: Apr. 23, 2013

(54) SYSTEM AND METHOD FOR ESTABLISHING AUTHENTICATED WIRELESS CONNECTION BETWEEN MOBILE UNIT AND HOST

(75) Inventors: Gary Schneider, Stony Brook, NY (US); Stephen J. Shellhammer, Ramona, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 2659 days.

(21) Appl. No.: 10/600,029

(22) Filed: Jun. 20, 2003

(65) Prior Publication Data

US 2005/0015618 A1    Jan. 20, 2005

(51) Int. Cl.
*H04L 9/00* (2006.01)
*H04L 29/06* (2006.01)
*H04L 9/32* (2006.01)
*H04K 1/00* (2006.01)
*G06F 21/00* (2006.01)

(52) U.S. Cl.
USPC ............ 380/270; 380/46; 380/255; 380/262; 380/268; 713/161; 713/168; 713/172; 713/186

(58) Field of Classification Search ................... 380/270, 380/46, 255, 262, 268; 340/5; 705/23, 39, 705/76; 713/161, 168, 172, 186
See application file for complete search history.

(56) References Cited

U.S. PATENT DOCUMENTS

| | | | | |
|---|---|---|---|---|
| 5,377,267 A | * | 12/1994 | Suzuki et al. | 380/248 |
| 5,534,857 A | * | 7/1996 | Laing et al. | 340/5.74 |
| 5,790,536 A | * | 8/1998 | Mahany et al. | 370/338 |
| 6,353,745 B1 | * | 3/2002 | Wehrend et al. | 455/466 |
| 6,424,249 B1 | * | 7/2002 | Houvener | 340/5.82 |
| 6,736,322 B2 | * | 5/2004 | Gobburu et al. | 235/462.46 |
| 6,990,339 B2 | * | 1/2006 | Turanyi et al. | 455/432.1 |
| 6,991,160 B2 | * | 1/2006 | Demere | 235/384 |
| 7,118,478 B2 | * | 10/2006 | Fayter et al. | 463/25 |
| 2001/0052083 A1 | * | 12/2001 | Willins et al. | 713/201 |
| 2002/0060246 A1 | * | 5/2002 | Gobburu et al. | 235/462.46 |
| 2002/0065728 A1 | * | 5/2002 | Ogasawara | 705/23 |
| 2002/0102966 A1 | * | 8/2002 | Lev et al. | 455/412 |
| 2003/0132298 A1 | * | 7/2003 | Swartz et al. | 235/472.02 |
| 2003/0172283 A1 | * | 9/2003 | O'Hara | 713/186 |
| 2003/0225711 A1 | * | 12/2003 | Paping | 705/404 |
| 2003/0230630 A1 | * | 12/2003 | Whipple et al. | 235/462.01 |
| 2004/0003295 A1 | * | 1/2004 | Elderfield et al. | 713/202 |
| 2004/0172536 A1 | * | 9/2004 | Malville et al. | 713/169 |

OTHER PUBLICATIONS

"Bluetooth Security", Bluetooth Specification, Version 1.1 May 8, 2001, pp. 141-178.

* cited by examiner

*Primary Examiner* — Mohammad W Reza

(57) ABSTRACT

Described is a method and system for establishing an authenticated wireless communication (e.g., using Bluetooth technology) between first and second mobile devices. The first device (e.g., a mobile barcode scanner) sends a signal to establish a wireless communication with the second device. The first device includes a data capturing arrangement ("DCA") as an only input device interface with a user thereof. The second device initiates an authentication process by requesting the first device to obtain a PIN code from the user. Once the first device obtains the PIN code from the user via the DCA, a pairing process is performed to compare the PIN code to entries in a database of authorized PIN codes. When the pairing process has been successfully completed, a link key is generated to establish the authenticated wireless communication between the first and second devices.

29 Claims, 3 Drawing Sheets

SYSTEM AND METHOD FOR ESTABLISHING AUTHENTICATED WIRELESS CONNECTION BETWEEN MOBILE UNIT AND HOST

BACKGROUND

With the advent of wireless networking, many problems have arisen regarding the security and the authentication of wireless communications between devices. One possible solution to these problems is to utilize a personal identity number ("PIN") code in order to establish an authenticated wireless communication between such devices. For example, the PIN code may be used when a first device is attempting to connect to a second device. The user of the first device is required to enter the PIN before the secure and authenticated wireless connection with the second device can be established.

In conventional devices, the user may enter the PIN code through any standard input means, such as a keyboard, a keypad, touch screen, etc. This method may present a problem, however, for certain types of mobile devices which lack those conventional input means. For example, a wireless barcode scanner may not have any of these conventional input means. There is a need for a system and method to enable the first devices that lack conventional input means to establish an authenticated wireless connection with the second devices.

SUMMARY OF THE INVENTION

The present invention relates to a method and system for establishing an authenticated wireless communication between a first mobile device and a second device. The first device may communicate with the second device using Bluetooth technology. The first device (e.g., a mobile barcode scanner) sends a first signal to establish an initial wireless communication with the second device. The first device includes a data capturing arrangement ("DCA") as the only input device interface with a user thereof. The second device initiates an authentication process by requesting the first device to obtain the PIN code from the user.

Once the first device obtains the PIN code from the user via the DCA, a pairing process is performed to compare the PIN code to entries in a database of authorized PIN codes. When the pairing process has been successfully completed, a link key is generated to establish the authenticated wireless communication between the first and second devices.

BRIEF DESCRIPTION OF THE DRAWINGS

The accompanying drawings are included to provide a further understanding of the invention and are incorporated into and constitute part of the specification, illustrate several embodiments of the invention and, together with the description, serve to explain examples of the present invention. In the drawings.

DETAILED DESCRIPTION

Figure 1:
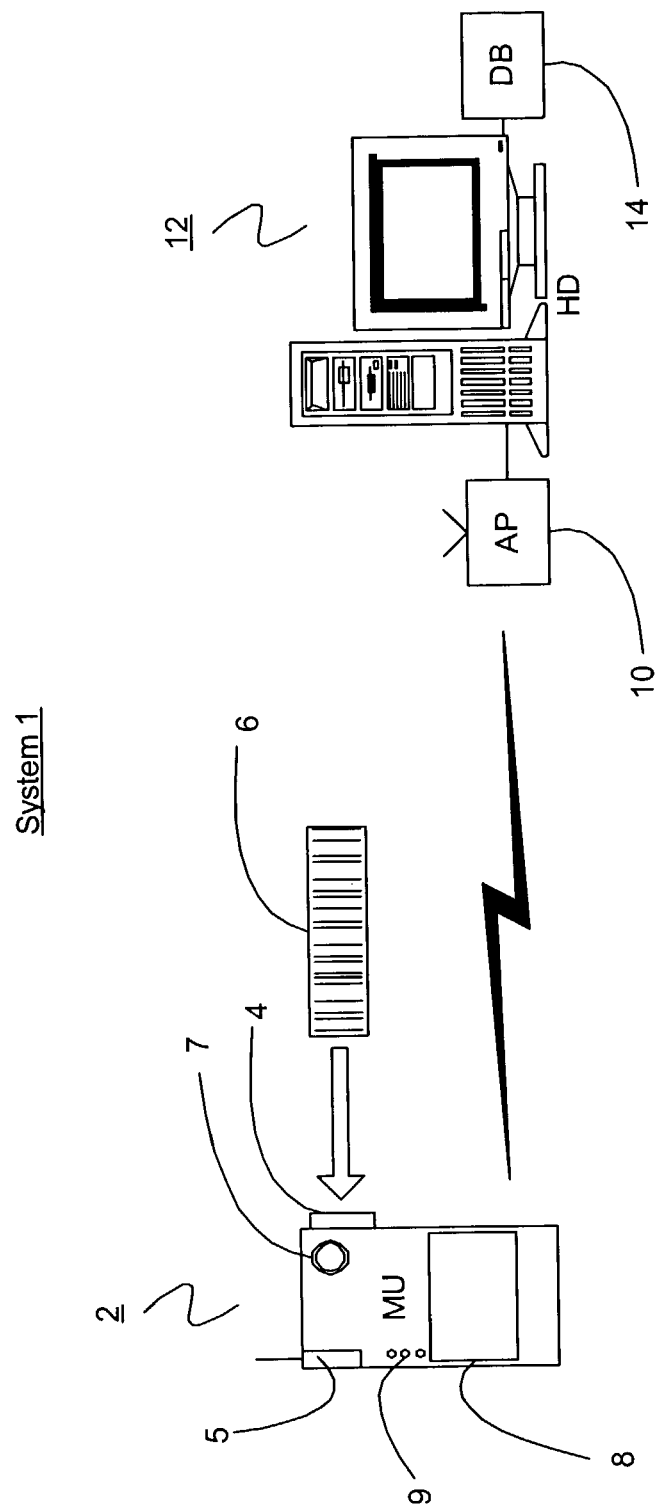
FIG. 1 shows an exemplary system according to the present invention for establishing an authenticated wireless connection between a mobile unit and a host device.

FIG. 1 shows an exemplary embodiment of a system 1 for establishing an authenticated wireless communication. The system 1 may include a plurality of devices that are capable of communicating with each other using any of conventional wireless communication standards (e.g., Bluetooth, etc.). The system 1 includes two such devices: a mobile unit ("MU") 2 and a host device ("HD") 12. The MU 2 may be a wireless mobile unit that is user-operated but is lacking conventional input means such as a keypad or a touchscreen (e.g., a mobile barcode scanner using Bluetooth technology). The MU 2 includes a wireless communication arrangement 5 which allows the MU 2 to wirelessly communicate with the HD 12.

The MU 2 may also include a data capturing arrangement ("DCA") 4 which is a primary means of inputting information into the MU 2 for a user of such device. The DCA 4 acquires images which are then processed to generate corresponding data encoded or stored in those images. The DCA 4 may be an imager that captures images using CCD technology or a scanner that captures images using a laser technoloy. For instance, the DCA 4 may generate pricing information by scanning a barcode 6 placed on merchandise. The barcode 6 may be a conventional barcode or a two-dimensional barcode. Those skilled in the art will understand that the barcode 6 may be any image that is capable of storing information that could be read by the MU 2.

In an alternative exemplary embodiment of the present invention, the MU 2 may include a plurality of output means (e.g., a display screen 8, a speaker 7, the LEDs 9). The screen 8 may display a variety of input and output data (e.g., showing the data acquired by the DCA 4, prompting the user to perform a specific action, etc.) Other output means may also be used to communicate with the user. For example, the speaker 7 may emit audible sounds and the LEDs 9 may pulsate in order to notify to the user of certain status changes (e.g., a low battery, input required, out of communication range, etc.).

The HD 12 is a computing device that may include a wireless access port ("AP") 10 and a database ("DB") 14. The AP 10 and the arrangement 5 provide the wireless connection between the HD 12 and the MU 2. The AP 10 and the arrangement 5 are capable of transmitting to, as well as receiving signals from each other. The DB 14 may contain a plurality of authorized PIN codes which correspond to authorized devices with which the HD 12 may communicate. The PIN codes are prestored into the DB 14 prior to communications with any devices (i.e., the MU 2).

Figure 2:
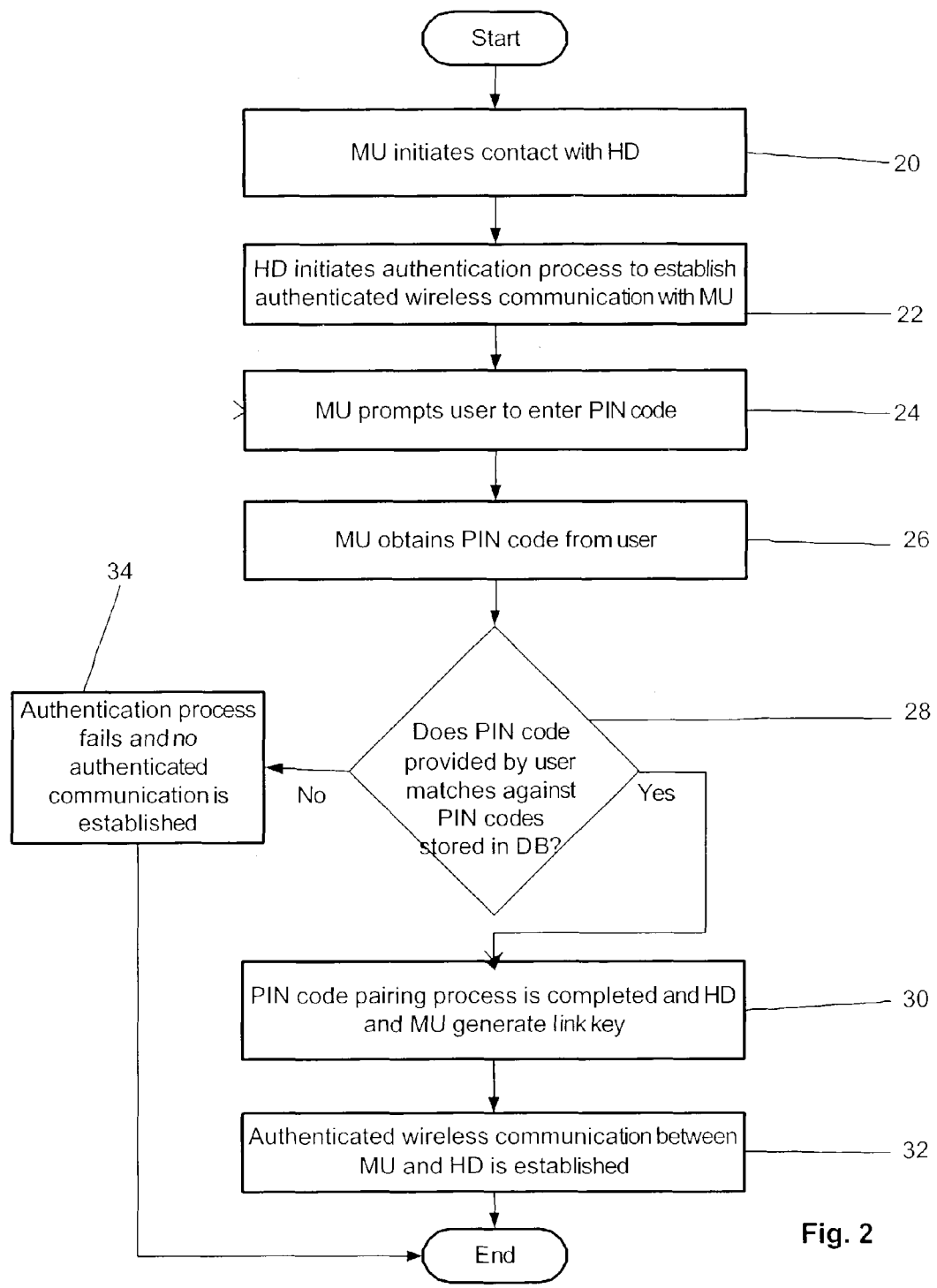
FIG. 2 shows an exemplary method according to the present invention for establishing the authenticated wireless connection between the mobile unit and the host device.

FIG. 2 shows an exemplary method for establishing the authenticated wireless connection between the MU 2 and the HD 12. In step 20, the MU 2 initiates a contact with the HD 12 by transmitting a wireless signal. The signal introduces the MU 2 to the HD 12 as a device which "desires" to establish the authenticated wireless communication with the HD 12.

In step 22, once the HD 12 receives the initial wireless signal from the MU 2, the HD 12 initiates an authentication process to confirm the identity of the MU 2 and to establish the authenticated communication between the devices. The authentication process commences by the HD 12 requesting the MU 2 to obtain the PIN code from the user. The PIN code indicates an identity of the MU 2 as a device with which the HD 12 is allowed to establish the authenticated communication. Thus, if the user cannot provide a proper PIN code to the MU 2, then, as described below in details, the authentication process may fail and the authenticated wireless communication cannot be established with the HD 12.

In step 24, after the MU 2 receives the request to obtain the PIN code from the user, the MU 2 prompts the user to enter the PIN code. The MU 2 may notify the user in a plurality of ways. For example, the MU 2 may emit a specific sound (e.g., a sequence of beeping sounds) which denotes that the user must enter the PIN code. Alternatively, the MU 2 may display a prompt on the screen 8 or flash certain LEDs 9 to notify the user of this status change.

In step 26, after the user is prompted to enter the PIN code, the user needs to enter the PIN code within a specified time period. In the exemplary embodiment, the user may scan the barcode 6 using the MU 2 to enter the PIN code. Once the barcode 6 is scanned, the MU 2 may notify the user that the PIN code has been extracted from the barcode 6 by using the available output means (e.g., displaying the confirmation on the screen 8, producing an audible sound, flashing LEDs 9, etc.).

If the PIN code is not timely provided to the MU 2, then, for example, the authentication process may be discontinued. For instance, the MU 2 and the HD 12 may be preprogrammed to await for a response for a specified period of time before aborting the authenticated process. The time period for entering the PIN code, however, must be sufficiently long, approximately 5 to 10 seconds, so that the user is able to scan the barcode 6.

In step 28, the PIN code provided by the user must be compared against authorized PIN codes stored in the DB 14 of the HD 12. This pairing process must be successfully completed between the HD 12 and the MU 2 prior to establishment of the authenticated wireless connection. During the pairing process, the HD 12 forwards first sample data (e.g., random data) to the MU 2. The MU 2 receives this first data and utilizes this first data in conjunction with the PIN code and a conventional hashing procedure to generate second data. At least a portion of the second data or the entire second data is forwarded to the HD 12 which utilizes one of the PIN codes stored in the DB 14 and the same hashing procedures to generate third data. The second data and the third data are compared. If the second and third data do not match, then the authentication process fails and no authenticated communication between devices is established (step 34). In an alternative exemplary embodiment of the present invention, the HD 12 returns to step 24 where it requires that the user reenter the PIN code into the MU 2. If, however, the second and third data matches, then the pairing process is successfully completed and a link key is generated (step 30).

The link key is a random number that is shared between the HD 12 and the MU 2 and utilized for the authenticated wireless communications between them. The link key may be a permanent link key or a temporary link key. The permanent link key may be stored in the HD 12 and the MU 2 and may be used after the current authenticated communication with the MU 2 is terminated. This procedure allows for faster connectivity during subsequent sessions between the MU 2 and the HD 12 since the pairing process may be completely circumvented. The temporary link key, however, lasts only for the duration of the current authenticated communication established by the MU 2. Hence, if the MU 2 attempts to establish the authenticated communication with the HD 12 at a later point, the MU 2 and the HD 12 would need to go through the authentication process once again.

In step 32, the HD 12 and the MU 2 establish the authenticated wireless connection using the link key. In addition, the users may desire to create a secure wireless communication between the MU 2 and the HD 12 by utilizing a conventional encryption technology to prevent, e.g., any "eavesdropping".

Figure 3:
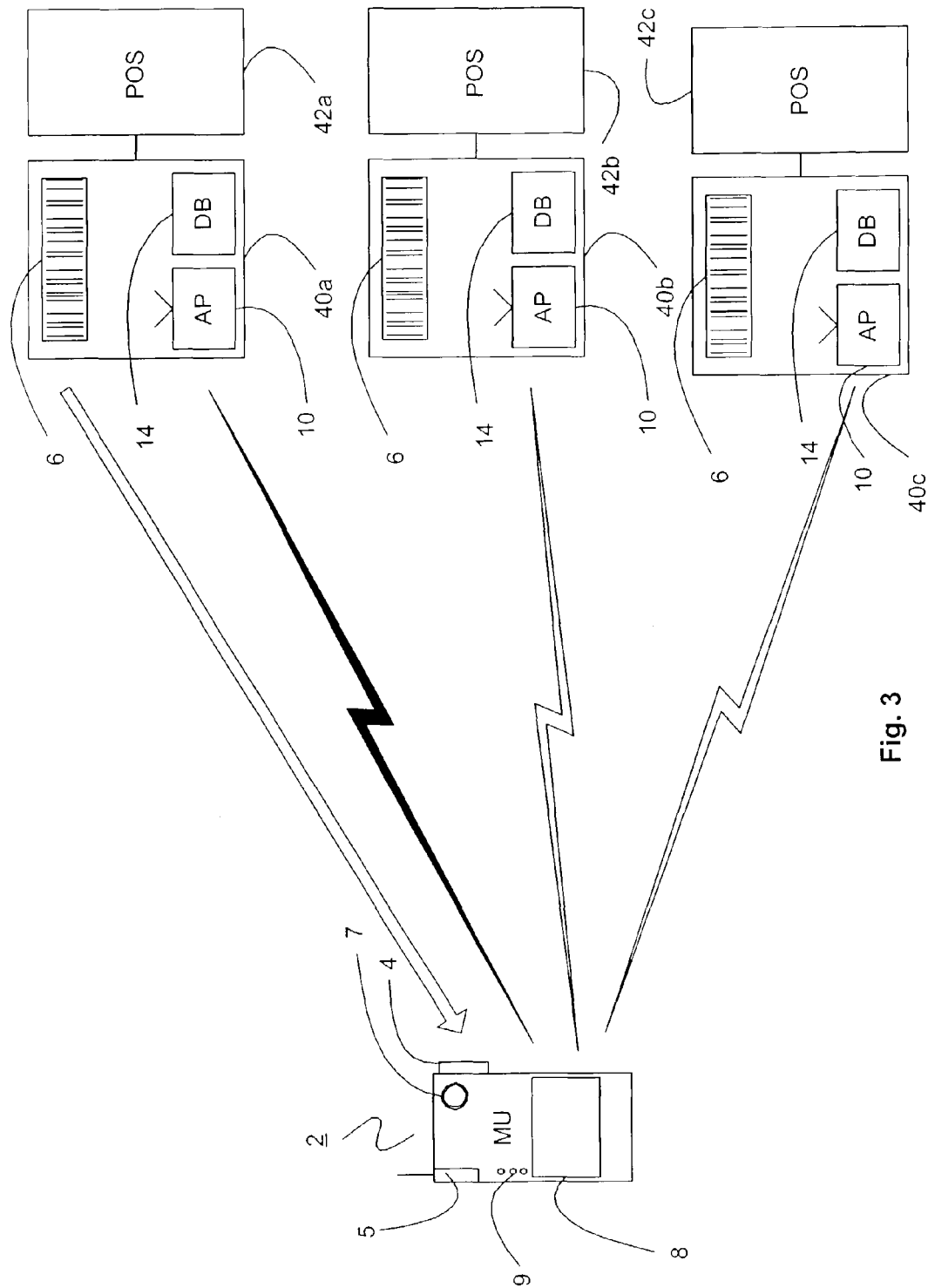
FIG. 3 shows another exemplary embodiment of the system according to the present invention which is utilized in a retail environment.

FIG. 3 shows an exemplary embodiment of a system according to the present invention which is utilized in a retail environment. The MU 2 may be a wireless barcode scanner that scans barcodes on merchandise during check-out to obtain specific information about the items (e.g., price, inventory, etc.). The MU 2 is capable of communicating with base stations 40a-40c which are substantially similar to the HD 12. The AP 10 is utilized for wireless communications with the MU 2. The barcode 6 includes a PIN code that allows the MU 2 to communicate with the station 40a and may be situated in a close proximity to the stations 40a-40c. Each station 40a-40c may be connected to a point-of-sale ("POS") terminals 42a-42c (e.g., cash register) respectively. The POS terminals 42a-42c may be used to perform checkout tasks (e.g., printing receipts, displaying prices, registering cash, etc.).

The present invention allows employees of a retail establishment to use any one of the POS terminals 42a-42c at their convenience. It is preferred, however, to ensure that the MU 2 only communicates with a single POS terminal 42a-42c at a time. Otherwise, a single MU 2 may connect to a plurality of POS terminals 42a-42c. This may create many technical problems for the retail establishment (e.g., improper charges to customer accounts, wrong inventory deductions, etc.).

As shown in FIG. 3 the MU 2 connects to the POS 42a. The user of the MU 2 initiates a wireless communication as discussed in step 20 shown in FIG. 2. The initial wireless communication may be received by all POS terminals 42a-42c, and each POS terminal 42a-42c may attempt to connect with the MU 2.

The problem of multiple wireless connections is alleviated by the present invention. Since the user of the MU 2 is required to enter a PIN code for the specific POS terminal 42a-42c with which he intends to establish the authenticated wireless communication, the MU 2 will only communicate with one POS terminal 42a-42c at a time. After initiating the wireless communication, the user scans the barcode 6 that appears on the station 40a attached to the POS 42a.

After scanning the barcode 6, the MU 2 establishes the authenticated wireless communication only with the POS 40 in the following manner. The MU 2 and POS terminals 42a-42c perform the pairing process. The PIN code may only match one of the authorized PIN codes stored in the DB 14 of the Pbs terminal 42a. Therefore, the MU 2 only pairs with the POS terminal 42a, and not other POS terminals 42b and 42c. This allows the MU 2 to communicate solely with a single POS terminal 42a without interfering with the operation of other POS terminals 42b and 42c.

One of the advantages of the present invention is that it provides for the authenticated wireless communications between mobile units which lack conventional input means and host devices. As illustrated in FIG. 3, a wireless barcode scanner may be used to operate any one of a plurality of host devices without interfering with the operation of others.

Another advantage of the present invention is that mobile units that are not authorized through the authentication process may not be able to establish authenticated communications with host devices. The PIN code requirement bars unauthenticated third party devices from communicating with the host devices. For instance, a third party may attempt to communicate with a host device by using a compatible mobile unit. The connection between the two devices would not be established, however, since the third party mobile unit would not have the proper PIN code, despite the fact that the third party mobile unit and the host device are compatible.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for establishing an authenticated wireless communication between a first mobile device and a second device, comprising the steps of:
    sending an initial signal by the first device to establish a wireless communication with the second device, the first device including only a data capturing arrangement ("DCA") as an input device interface with a user thereof;
    initiating an authentication process by the second device;
    obtaining a PIN code from the user via the DCA, the PIN code identifying at least one device with which the first device is authorized to communicate;
    performing a pairing process to compare the PIN code to entries in a database of authorized PIN codes;
    when the pairing process has been successfully completed, generating a link key to establish the authenticated wireless communication between the first and second devices.

2. The method according to claim 1, wherein the databases is stored in a memory arrangement of the second device.

3. The method according to claim 1, wherein the first device is a mobile barcode scanner.

4. The method according to claim 1, wherein the first device communicates with the second device using Bluetooth technology.

5. The method according to claim 1, wherein the obtaining step further includes the following substeps:
    scanning a barcode using the DCA, the barcode being provided by the user as the PIN code, and
    converting the barcode into the PIN code using a processor of the first device.

6. The method according to claim 1, wherein the second device includes a wireless access point which communicates with the first device.

7. The method according to claim 1, wherein the first device includes an alerting arrangement notifying the user when to enter the PIN code.

8. The method according to claim 7, wherein the alerting arrangement includes at least one of a speaker emitting a predetermined sound and a set of LEDs emitting a predetermined lighting pattern.

9. The method according to claim 1, wherein the obtaining step includes the following substeps:
    limiting a time period for the user to enter the PIN code to a predetermined time period, and
    refusing to accept the PIN code from the user when the predetermined time period has expired.

10. The method according to claim 1, wherein the pairing process includes the following substeps:
    compiling a first sample data, from a collection of random data by the second device, the second device then providing the first sample data to the first device,
    generating second data, by the first device, as a function of the first sample data, the PIN code and a hashing procedure;
    providing at least a portion of the second data by the first device to the second device,
    generating third data by the second device as a function of at least one of the authorized PIN codes stored in the database, the second data received from the first device and the hashing procedure;
    comparing, by the second device, the second data received from the first device to the corresponding third data, and
    when the second data received from the first device matches to the third data, generating an indication the pairing process is successfully completed.

11. The method according to claim 1, wherein the link key is one of a temporary key which is effective only for a single session and a long-term key which is effective for multiple sessions between the first and second devices.

12. The method according to claim 1, further comprising the step of:
    establishing a secure communication between the first and second devices using a predetermined encryption technology.

13. A system for establishing an authenticated wireless communication, comprising:
    a first wireless mobile device including only a data capturing arrangement ("DCA") as an input device interface with a user thereof; and
    a second device receiving an initial signal from the first device to establish a wireless communication, the second device initiating an authentication process,
    wherein the first device obtains a PIN code from the user via the DCA, the PIN code identifying at least one device with which the first device is authorized to communicate, wherein the first and second devices perform a pairing process to compare the PIN code to entries in a database of authorized PIN codes, and wherein, when the pairing process has been successfully completed, the first and second devices generate a link key to establish the authenticated wireless communication.

14. The system according to claim 13, wherein the second device includes a memory arrangement storing the database.

15. The system according to claim 13, wherein the first device is a mobile barcode scanner.

16. The system according to claim 13, wherein the first device communicates with the second device using Bluetooth technology.

17. The system according to claim 13, wherein the first device scans a barcode using the DCA, the barcode being provided by the user as the PIN code, a processor of the first device converting the barcode into the PIN code.

18. The system according to claim 13, wherein the second device includes a wireless access point which communicates with the first device.

19. The system according to claim 13, wherein the first device includes an alerting arrangement notifying the user to enter the PIN code.

20. The system according to claim 19, wherein the alerting arrangement includes at least one of a speaker emitting a predetermined sound and a set of LEDs emitting a light in a predetermined lighting patterns.

21. The system according to claim 13, wherein the pairing process includes the following substeps:
    compiling a first sample data, from a collection of random data, by the second device, the second device then providing the first sample data to the first device,
    generating second data, by the first device, as a function of the first sample data, the PIN code and a hashing procedure;
    providing at least a portion of the second data by the first device to the second device,
    generating third data by the second device as a function of at least one of the authorized PIN codes stored in the database, the second data received from the first device and the hashing procedure;
    comparing, by the second device, the second data received from the first device to the corresponding third data, and
    when the second data received from the first device matches to the third data, generating an indication the pairing process is successfully completed.

22. The system according to claim 15, wherein the link key is one of a temporary key which is effective only for a single session and a long-term key which is effective for multiple sessions between the first and second devices.

23. The system according to claim 13, wherein the first and second devices establish a secure communication using a predetermined encryption technology.

24. A wireless mobile device for establishing an authenticated wireless communication with a further device, comprising:
   a processor;
   a wireless communication arrangement; and
   a data capturing arrangement ("DCA") being the only input device interface for a user thereof,
   wherein the processor generates a request for establishing an authenticated wireless communication, the request being forwarded to the further device via the communication arrangement, the communication arrangement receives from the further device a first sample data, compiled from a collection of random data, and a request for second data, the DCA obtaining a PIN code from the user, the PIN code identifying at least one device with which the mobile device is authorized to communicate, the processor generating the second data as a function of the PIN code, the first sample data and the hashing procedure, the second data being provided, by the mobile device, to the further device,
   wherein the further device generates third data as a function of at least one of the authorized PIN codes stored in a database, the second data received from the mobile device and the hashing procedure, and
   wherein, when the second data received from the mobile device matches to the third data, the mobile device and the further device generate a link key to establish the authenticated wireless communication.

25. The mobile device according to claim 24, wherein the mobile device is a mobile barcode scanner.

26. The mobile device according to claim 24, wherein the mobile device communicates with the further device using Bluetooth technology.

27. The mobile device according to claim 24, wherein the DCA scans a barcode which is provided by the user as the PIN code, the processor converting the barcode into the PIN code.

28. The mobile device according to claim 24, further comprising:
   an alerting arrangement notifying the user to enter the PIN code.

29. The mobile device according to claim 24, wherein the alerting arrangement includes at least one of a speaker emitting a predetermined sound and a set of LEDs emitting a predetermined lighting pattern.

* * * * *